US006956802B2

(12) United States Patent
Kato et al.

(10) Patent No.: US 6,956,802 B2
(45) Date of Patent: Oct. 18, 2005

(54) APERTURE RATIO MEASURING APPARATUS FOR OPTICAL RECORDING MEDIUM WITH PRE-PITS

(75) Inventors: Masahiro Kato, Tokorozawa (JP); Naoharu Yanagawa, Tokorozawa (JP); Tatsuhiro Yone, Tokorozawa (JP); Yuko Muramatsu, Tokorozawa (JP); Shinji Suzuki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 674 days.

(21) Appl. No.: 10/079,041

(22) Filed: Feb. 21, 2002

(65) Prior Publication Data

US 2002/0123862 A1 Sep. 5, 2002

(30) Foreign Application Priority Data

Feb. 23, 2001 (JP) ........................................ 2001-47778

(51) Int. Cl.[7] ................................................ G06F 15/00
(52) U.S. Cl. ..................................... 369/53.22; 702/186
(58) Field of Search ............................. 369/53.22, 53.2

(56) References Cited

U.S. PATENT DOCUMENTS 5,062,091 A * 10/1991 Maeda et al. ............ 369/13.02
6,545,972 B1 * 4/2003 Kato et al. ............. 369/124.12
2003/0169676 A1 * 9/2003 Konishi et al. .......... 369/275.3

FOREIGN PATENT DOCUMENTS

JP 10-283638 10/1998

* cited by examiner

*Primary Examiner*—David Hudspeth
*Assistant Examiner*—Adam R. Giesy
(74) *Attorney, Agent, or Firm*—Sughrue Mion, PLLC

(57) ABSTRACT

An AR measuring apparatus receives the reflection light of an optical beam irradiated on an optical recording medium having a recording surface on which pre-pits are repeatedly formed between tracks by means of a first light receiving surface and a second light receiving surface, obtains a push-pull signal based on the difference between light receiving signals from the first and second light receiving surfaces, collects sample data by sampling the push-pull signals for a predetermined period of time, repeats the sampling for the predetermined period of time by a plurality of times, determines whether or not each data value corresponding to a pre-pit position of the sample data by the plurality of times is obtained by a predetermined number of times or greater, and when data values obtained by the predetermined number of times or greater are determined, calculates as an aperture ratio, a ratio between the minimum value and the maximum value of values corresponding to a pre-pit component of the data values obtained by the predetermined number of times or greater.

7 Claims, 13 Drawing Sheets

APERTURE RATIO MEASURING APPARATUS FOR OPTICAL RECORDING MEDIUM WITH PRE-PITS

BACKGROUND OF THE INVENTION

1. Field of the Invention

The present invention relates to an aperture ratio (AR) measuring apparatus for an optical recording medium having a recording surface on which pre-pits carrying information regarding the information recording tracks are repeatedly formed between such information recording tracks.

2. Description of the Related Background Art

Recently, CD-R, CD-RW, DVD-R, DVD-RW, DVD-RAM, etc. have been known as optical recording discs on which information data can be written. In addition, information recording/playing apparatuses are in practical use which can record and reproduce information data on such a recording disc.

FIG. 1 is a schematic view of the area configuration of a DVD-RW as such a recording disc.

As shown in FIG. 1, a DVD-RW has a data configuration comprising the following areas from the inner edge to the outer edge: PCA (Power Calibration Area), RMA (Recording Management Area), lead-in area, data area, and lead-out area. The PCA is an area on which data is written as a test to determine the recording power of laser beam. The RMA is an area on which management information regarding recording is written. A part of the lead-in area contains an embossed area. The embossed area contains phase pits formed on the disc beforehand. Information regarding copy prevention is written on the embossed area.

FIG. 2 shows a part of the recording surface of a disc on which data can be recorded.

As shown in FIG. 2, on a substrate 101, convex groove tracks 103 on which information pits Pt for carrying information data are formed and concave land tracks 102 are alternately formed, spirally or concentrically. Furthermore, a plurality of LPPs (land pre-pits) 104 are formed between the adjacent groove tracks 103. The LPPs 104 are formed beforehand on the land tracks 102 to indicate the recording timing and the address of information data for a disc recorder which records such information data. The groove tracks 103 are formed as grooves from the side of the substrate 101 and the LPPs 104 are formed as pits from the side of the substrate 101.

In a disc player for playing an optical disc having such LPPs, an LPP detection circuit is equipped. The LPP detection circuit includes a binarization circuit. The LPP detection circuit receives a reflection beam from the optical disc by means of an optical detector divided into two sections in the track tangential direction of a pickup, and obtains the differential signal of an output signal of the optical detector, that is, a radial push-pull signal PP. The push-pull signal PP has a waveform as shown in FIG. 3. An LPP component projects from the push-pull signal PP. A pre-pit detection signal $PP_D$ showing LPP detection is generated by comparing the level of the push-pull signal PP with a threshold value.

As shown in FIG. 4, the pre-pit detection signal $PP_D$ exhibits a pulse-shaped level change at each pickup read position corresponding to the LPP. The pre-pit detection signal $PP_D$ contains a synchronous pulse $P_{SYNC}$ at the beginning of each period T as shown in FIG. 4. The synchronous pulse $P_{SYNC}$ is followed by two pre-data pulses at a predetermined interval to indicate data such as address, etc. These pre-data pulses do not always exist at each period. As shown in FIG. 4, the third pulse from the synchronous pulse $P_{SYNC}$ is a pre-data pulse $P_D$ carrying a sector address. When information is recorded on an optical disc, such information is recorded by detecting the address on the optical disc based on this pre-pit detection signal $PP_D$.

In the manufacture of an optical disc containing LPPs, the LPPs of the manufactured optical disc must conform to a prescribed LPP standard. An AR (Aperture Ratio) is measured to determine whether an optical disc conforms to said LPP standard. For AR measurement, the LPP component of the push-pull signal PP (the third LPP position from the synchronous LPP) is repeatedly sampled for a predetermined period of time. By this sampling, the overlapped waveform of the push-pull signal PP at the third LPP position, that is, an AR waveform, is indicated on a display unit such as an oscilloscope as shown in FIG. 5. It is necessary that the maximum value APmax and the minimum value APmin of the peak values from the maximum value WOmax of the groove track component of the indicated push-pull signal PP should be detected, and the AR value is calculated by the equation AR=APmin/APmax in order to confirm that such AR value is greater than a specified value. A greater AR value means that the binarization range becomes wider and pre-pit detection accuracy becomes higher.

If there is foreign matter such as dirt stuck to a disc, the foreign matter may introduce noise into the push-pull signal PP of the LPP component in AR measurement. Moreover, if such noise is generated at such a level that the minimum value APmin of the peak value of the push-pull signal PP decreases, the calculated AR value may not reach the prescribed value even though the disc conforms to the standard. Therefore, it is necessary to decrease the influence of foreign matter as much as possible in order to correctly calculate the AR value.

SUMMARY OF THE INVENTION

An object of the present invention is to provide an AR measuring apparatus for an optical recording medium having pre-pits which can detect an AR value properly by eliminating the influence of foreign matter stuck to the disc surface as much as possible.

According to the present invention, there is provided an aperture ratio measuring apparatus for an optical recording medium having a recording surface provided with pre-pits which are repeatedly formed between tracks and carries information related to the tracks, comprising: an optical detector having a light receiving surface divided into a first and second light receiving faces in the tangential direction of the track, for receiving the reflected light of a light beam radiated onto the recording surface on the first and second light receiving faces to output first and second light detection signals corresponding to respective amounts of the received light on the first and second light receiving faces; a subtractor for calculating the difference between the first and second light detection signals output from the optical detector to generate a push-pull signal; a collection device for collecting sample data by sampling the push-pull signal for a predetermined period of time and for repeating the sampling operation for the predetermined period of time by a plurality of times; a frequency determination device for determining whether each data value corresponding to a pre-pit position of the sample data by the plurality of times collected by the collection device is obtained by a predetermined number of times or greater; and an aperture ratio calculator, when data values obtained by the predetermined number of times or greater are determined by the frequency determination device, for calculating as an aperture ratio, a ratio between the minimum value and the maximum value of values corresponding to a pre-pit component of the data values obtained by the predetermined number of times or greater.

According to the present invention, there is provided an aperture ratio measuring method for an optical recording medium having a recording surface provided with pre-pits which are repeatedly formed between tracks and carries information related to the tracks, comprising: an optical detection step for receiving the reflected light of a light beam radiated onto the recording surface, on a light receiving surface having first and second light receiving faces divided in the tangent direction of the track, to output first and second light detection signals corresponding to respective amounts of the received light on the first and second light receiving faces; a subtraction step for calculating the difference between the first and second light detection signals to generate a push-pull signal; a collection step for collecting sample data by sampling the push-pull signal for a predetermined period of time and for repeating the sampling operation for the predetermined period of time by a plurality of times; a frequency determination step for determining whether each data value corresponding to a pre-pit position of the sample data by the plurality of times collected in the collection step is obtained by a predetermined number of times or greater; and an aperture ratio calculation step, when data values obtained by the predetermined number of times or greater are determined in the frequency determination step, for calculating as an aperture ratio, a ratio between the minimum value and the maximum value of values corresponding to a pre-pit component of the data values obtained by the predetermined number of times or greater.

According to the present invention, there is provided a computer data signal representing a series of instructing which cause a computer to perform steps to execute a measuring process in an aperture ratio measuring apparatus for an optical recording medium having a recording surface provided with pre-pits which are repeatedly formed between tracks and carries information related to the tracks, the steps comprising: an optical detection step for receiving the reflected light of a light beam radiated onto the recording surface, on a light receiving surface having first and second light receiving faces divided in the tangent direction of the track, to output first and second light detection signals corresponding to respective amounts of the received light on the first and second light receiving faces; a subtraction step for calculating the difference between the first and second light detection signals to generate a push-pull signal; a collection step for collecting sample data by sampling the push-pull signal for a predetermined period of time and for repeating the sampling operation for the predetermined period of time by a plurality of times; a frequency determination step for determining whether each data value corresponding to a pre-pit position of the sample data by the plurality of times collected in the collection step is obtained by a predetermined number of times or greater; and an aperture ratio calculation step, when data values obtained by the predetermined number of times or greater are determined in the frequency determination step, for calculating as an aperture ratio, a ratio between the minimum value and the maximum value of values corresponding to a pre-pit component of the data values obtained by the predetermined number of times or greater.

DETAILED DESCRIPTION OF THE PREFERRED EMBODIMENTS

The embodiments of the present invention will be described in detail below with reference to the accompanying drawings.

Figure 1:
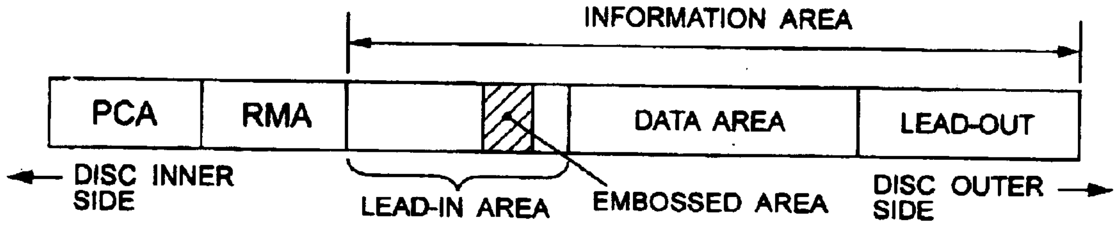
FIG. 1 shows the layout structure of each area of a DVD-RW.
Figure 2:
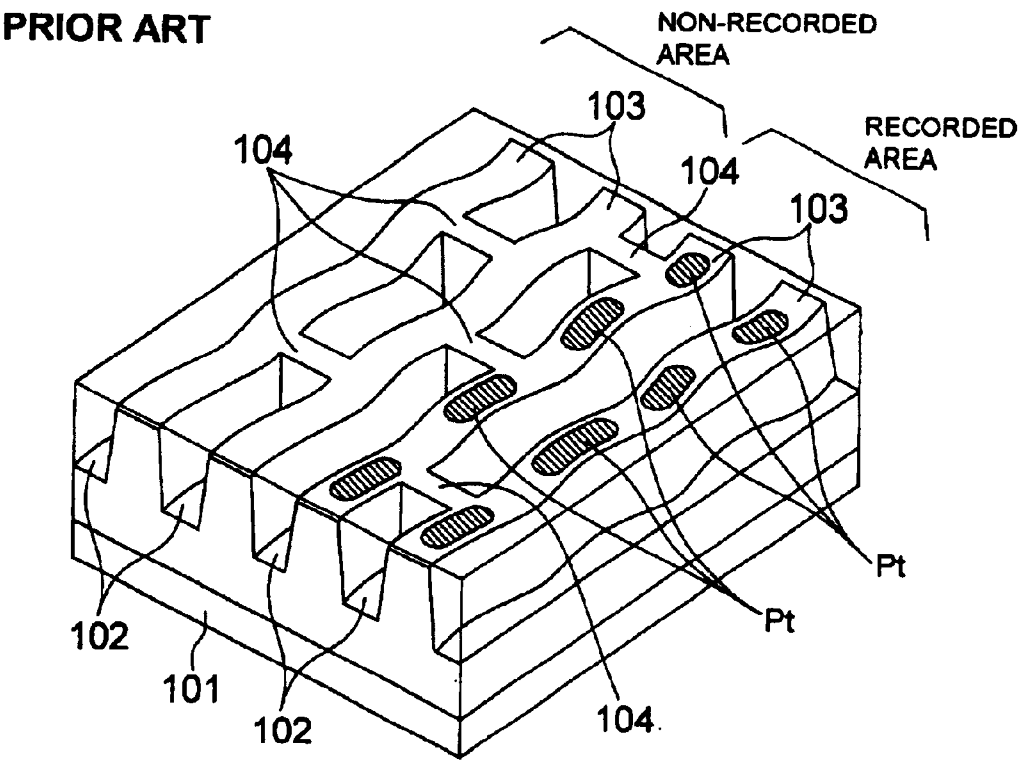
FIG. 2 shows the configuration of the recording surface of a DVD-RW.
Figure 3:
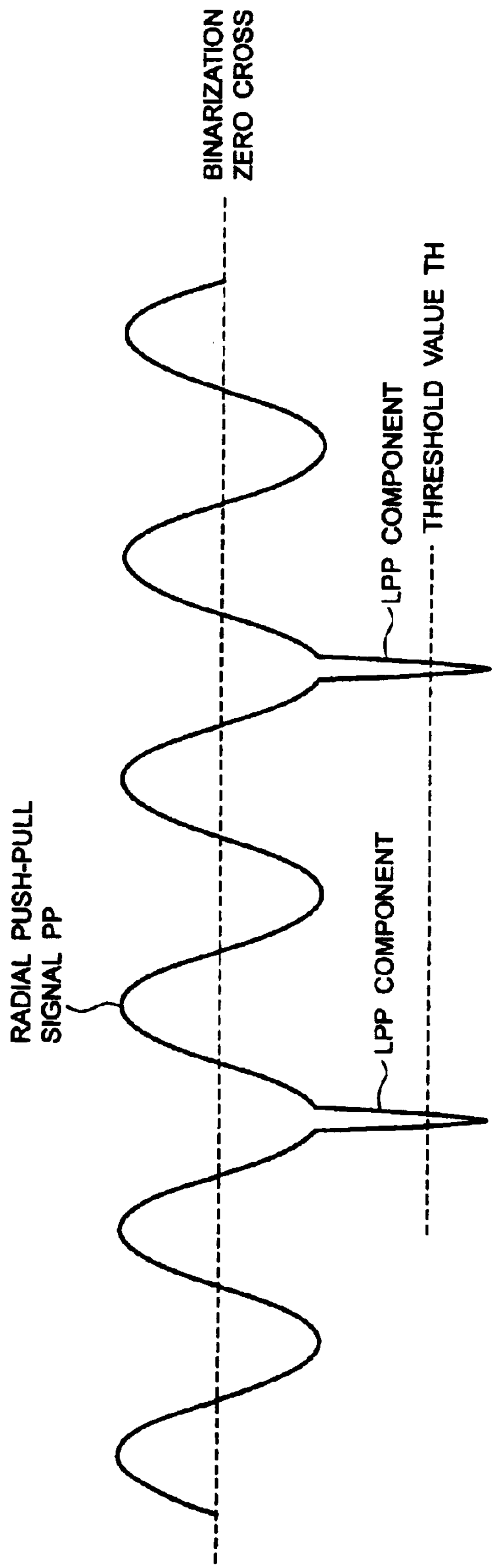
FIG. 3 shows the waveform of a radial push-pull signal containing an LPP component.
Figure 6:
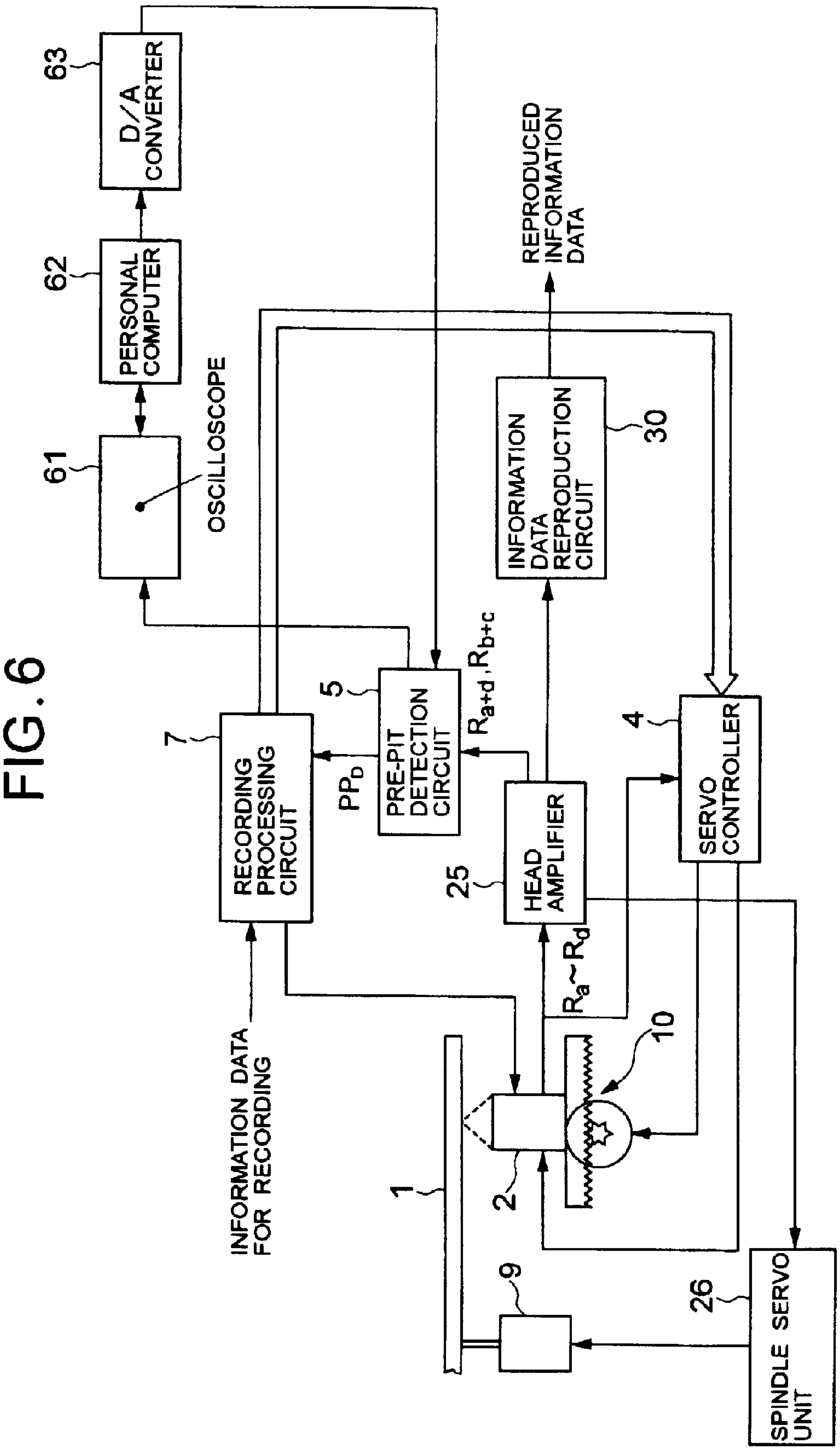
FIG. 6 is a block diagram of an AR measuring apparatus according to the present invention.

FIG. 6 shows an AR measuring apparatus according to the present invention. This AR measuring apparatus comprises a writing/reading head 2 which can write and read information on an optical disc 1 to be inspected. The writing/reading head 2 is equipped with a recording beam light generator (not shown) for recording information data on a writable or rewritable optical disc 1 having a recording surface as shown in FIG. 2, a reading beam light generator (not shown) for reading recorded information (including information data) from the optical disc 1, and an optical detector divided into four sections (20 in FIG. 7).

It is not necessary to provide a recording beam light generator and a reading beam light generator separately. One light beam generator may be used if it generates a recording light beam when recording is performed and a reading light beam when reading is performed.

Figure 7:
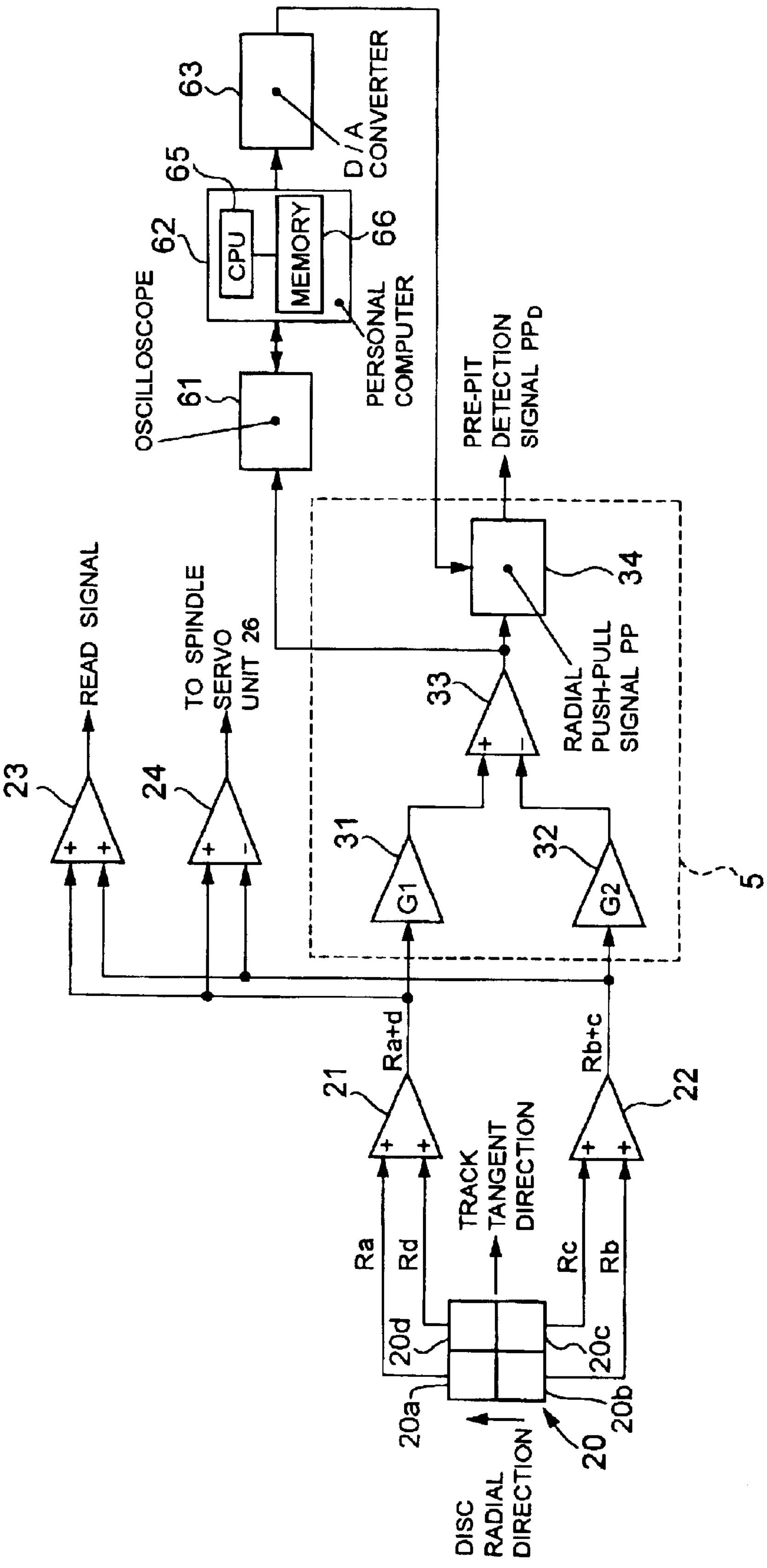
FIG. 7 is a block diagram of the configurations of a head amplifier and a pre-pit detection circuit in the apparatus in FIG. 6.

The reading beam light generator radiates a reading beam light onto the optical disc 1, which is rotatively driven rotated by a spindle motor 9, so as to make an information reading spot formed on the recording surface thereof. As shown in FIG. 7, the four-section optical detector 20 comprises a photoelectric transfer element having light-receiving surfaces 20*a* to 20*d* divided into four by the direction in line with the tangent of the information recording track (groove track 103) of the optical disc 1 and the direction orthogonal to the tangent of the recording track. The photoelectric transfer element receives the reflection light of the information reading spot reflected from the optical disc 1 by each of the four light-receiving surfaces 20*a* to 20*d*, converts each of the four received reflection lights into separate electric signals, and outputs the signals as light receiving signals Ra to Rd.

A servo controller 4 generates a focus error signal, a tracking error signal, and a slider drive signal based on these light receiving signals Ra to Rd. The focus error signal is supplied to a focusing actuator (not shown) which is mounted on the writing/reading head 2. The focusing actuator adjusts the focus of the information reading spot based on the focus error signal. The tracking error signal is supplied to a tracking actuator (not shown) mounted on the writing/reading head 2. The tracking actuator adjusts, in the radial direction of the disc, the position where the information reading spot is formed based on the tracking error signal. The slider drive signal is supplied to a slider 10. The slider 10 moves the writing/reading head 2 in the radial direction of the disc at a speed corresponding to the slider drive signal.

The light receiving signals Ra to Rd are supplied to a head amplifier 25 having adders 21 to 23 and a subtracter 24. The adder 21 adds the light receiving signals Ra and Rd, and the adder 22 adds the light receiving signals Rb and Rc. That is, the adder 21 adds the light receiving signals Ra and Rd obtained from the respective light-receiving surfaces **20*a* and 20*d* of the four-section optical detector 20, and outputs an added light receiving signal $R_{a+d}$. The adder 22 adds the light receiving signals Rb and Rc obtained from the respective light-receiving surfaces 20*b* and 20*c* of the four-section optical detector 20**, and outputs an added light receiving signal $R_{b+c}$.

The adder 23 adds the output signals $R_{a+d}$ and $R_{b+c}$ from adder 21 and adder 22 respectively. The output signal from the adder 23 is a reading signal, that is, an RF signal, and is supplied to an information data reproduction circuit 30. The information data reproduction circuit 30 binarizes the reading signal, then sequentially performs a demodulating process, error correcting process, and various information decoding processes so as to reproduce information data (video data, audio data, computer data) recorded on the optical disc 1, and outputs these data.

The subtracter 24 subtracts the output signal $R_{b+c}$ of the adder 22 from the output signal $R_{a+d}$ of the adder 21. The output signal of the subtracter 24 becomes a signal that indicates the frequency of wobbling of the groove track 103, and is supplied to a spindle servo unit 26 of the spindle motor 9. The spindle servo unit 26 rotatively drives the spindle motor 9 so that the frequency obtained from the output signal of the subtracter 24 corresponds to a predetermined rotational speed. As the configuration of the spindle servo unit 26 has already been disclosed in the Japanese Patent Laid-Open Publication No. Hei 10-283638, a description of it is omitted here.

A pre-pit detection circuit 5 detects a land pre-pit (LPP) 104 formed on a land track (pre-pit track) 102 of the optical disc 1 as shown in FIG. 2 based on each of the output signals of the adders 21, 22, then supplies a pre-pit detection signal $PP_D$ to a recording processing circuit 7.

The recording processing circuit 7 recognizes the current position where the writing/reading head 2 is recording, that is, the position on the groove track 103 based on the pre-pit detection signal $PP_D$, and supplies a control signal to the servo controller 4 for making the writing/reading head 2 skip tracks from this recording position to the desired recording position. The recording processing circuit 7 also generates a record modulating data signal by performing the desired record modulating process on the information data to be recorded (information data to be inspected), and supplies the signal to the writing/reading head 2. A recording beam light generator mounted on the writing/reading head 2 generates a recording beam light corresponding to the record modulating data signal, and radiates this beam light onto the groove track 103 of the optical disc 1. At this time, heat is conveyed to the area on the groove track 103 where the recording beam is radiated, and an information pit is formed thereon.

The configuration of the recording processing circuit 7 has also been disclosed in the Japanese Patent Laid-Open Publication No. Hei 10-283638, so a detailed description of it is omitted here.

The pre-pit detection circuit 5 comprises an amplifier 31 for amplifying the output signal $R_{a+d}$ of the adder 21, an amplifier 32 for amplifying the output signal $R_{b+c}$ of the adder 22, a subtracter 33 for subtracting the output signal of the amplifier 32 from the output signal of the amplifier 31 and outputting the result as a radial push-pull signal (group wobble signal) PP, and a binarization circuit 34 for binarizing the output push-pull signal PP of the subtracter 33 by a threshold value TH so as to generate a pre-pit detection signal $PP_D$, as shown in FIG. 7. The gain G1 of the amplifier 31 and the gain G2 of the amplifier 32 are set to be G1=G2.

The push-pull signal PP output from the subtracter 33 is supplied to an oscilloscope 61. The oscilloscope 61 samples the push-pull signal PP and indicates, for example, the part corresponding to the LPP in the push-pull signal PP.

The oscilloscope 61 is connected to a personal computer 62. The personal computer 62 calculates the threshold value TH by using the level data of the push-pull signal PP stored in the internal memory of the oscilloscope 61 (for example, sample memory 93 to be described). No specific configuration of the personal computer 62 is shown here, but it contains a CPU 65 and an internal memory 66. A D/A converter 63 is connected to the output port of the personal computer 62. The D/A converter 63 converts the slice level calculated by the personal computer 62 into an analog signal. The output signal of the D/A converter 63 is supplied to the binarization circuit 34 as a threshold value signal for binarization.

Connection of the personal computer 62 to the oscilloscope 61 and the D/A converter 63 is based on an interface standard such as GPIB, 10BASE-T, or RS-232C.

The signal output from the binarization circuit 34 (pre-pit detection signal $PP_D$) is supplied to an error rate detection circuit (not shown). An error rate corresponding to the supplied signal is detected there.

Figure 8:
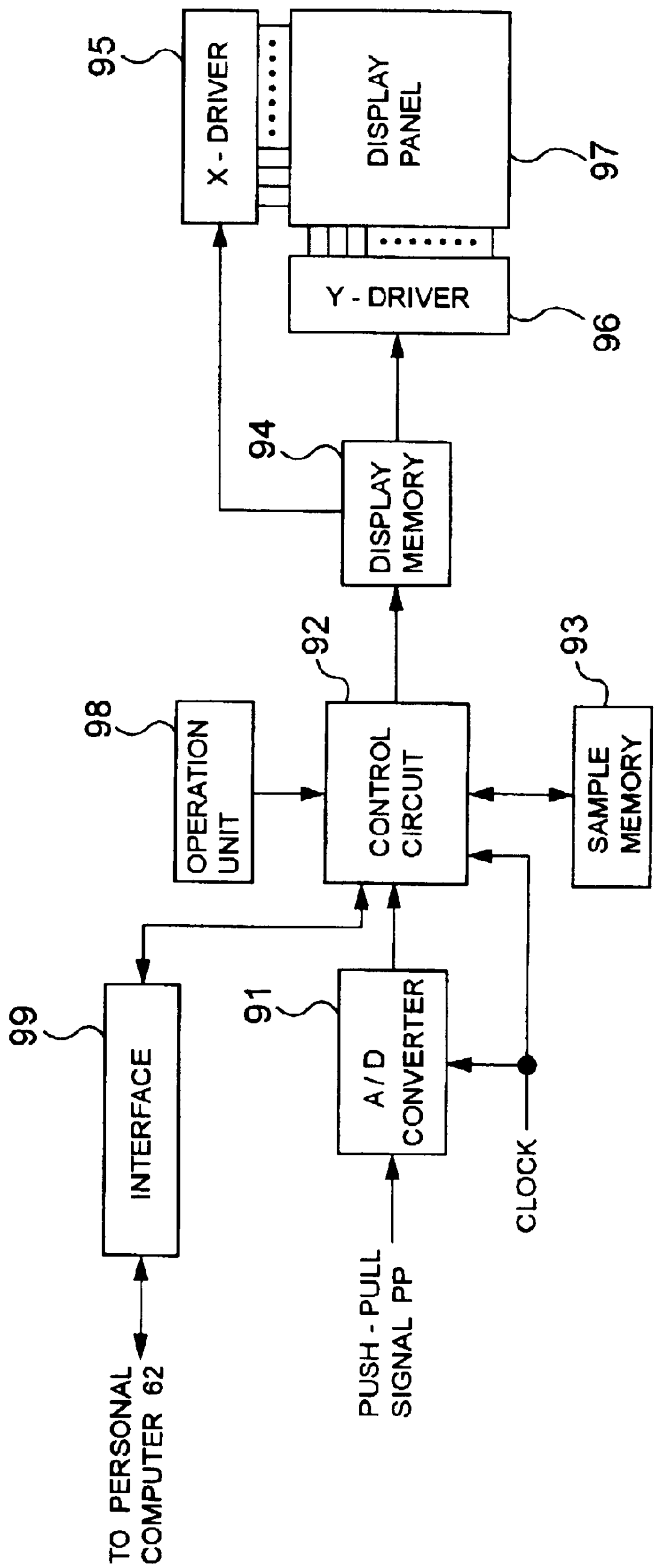
FIG. 8 is a block diagram of the schematic configuration of an oscilloscope in the apparatus in FIG. 6.

The oscilloscope 61 may be configured, for example, as shown in FIG. 8. That is, the oscilloscope 61 comprises an A/D converter 91, a control circuit 92, a sample memory 93, a display memory 94, X and Y drivers 95 and 96, a display panel 97, an operation unit 98, and an interface 99. The A/D converter 91 converts an input analog signal into a digital signal. The control circuit 92 sequentially writes sample data of the digital signal obtained by the A/D converter 91 into the sample memory 93, and fetches the data to display by reading data from the sample memory 93 and writing the data into the display memory 94. The X and Y drivers 95 and 96 drive the display panel 97 according to the data written in the display memory 94 so as to display the waveform of the input analog signal on the display panel 97. The interface 99 is a circuit based on an interface standard such as GPIB, 10BASE-T, or RS-232C for connecting the personal computer 62. The interface 99 transfers data written in the sample memory 93 to the personal computer 62 through the control circuit 92. The interface 99 relays and supplies commands from the personal computer 62 to the control circuit 92.

Figure 9:
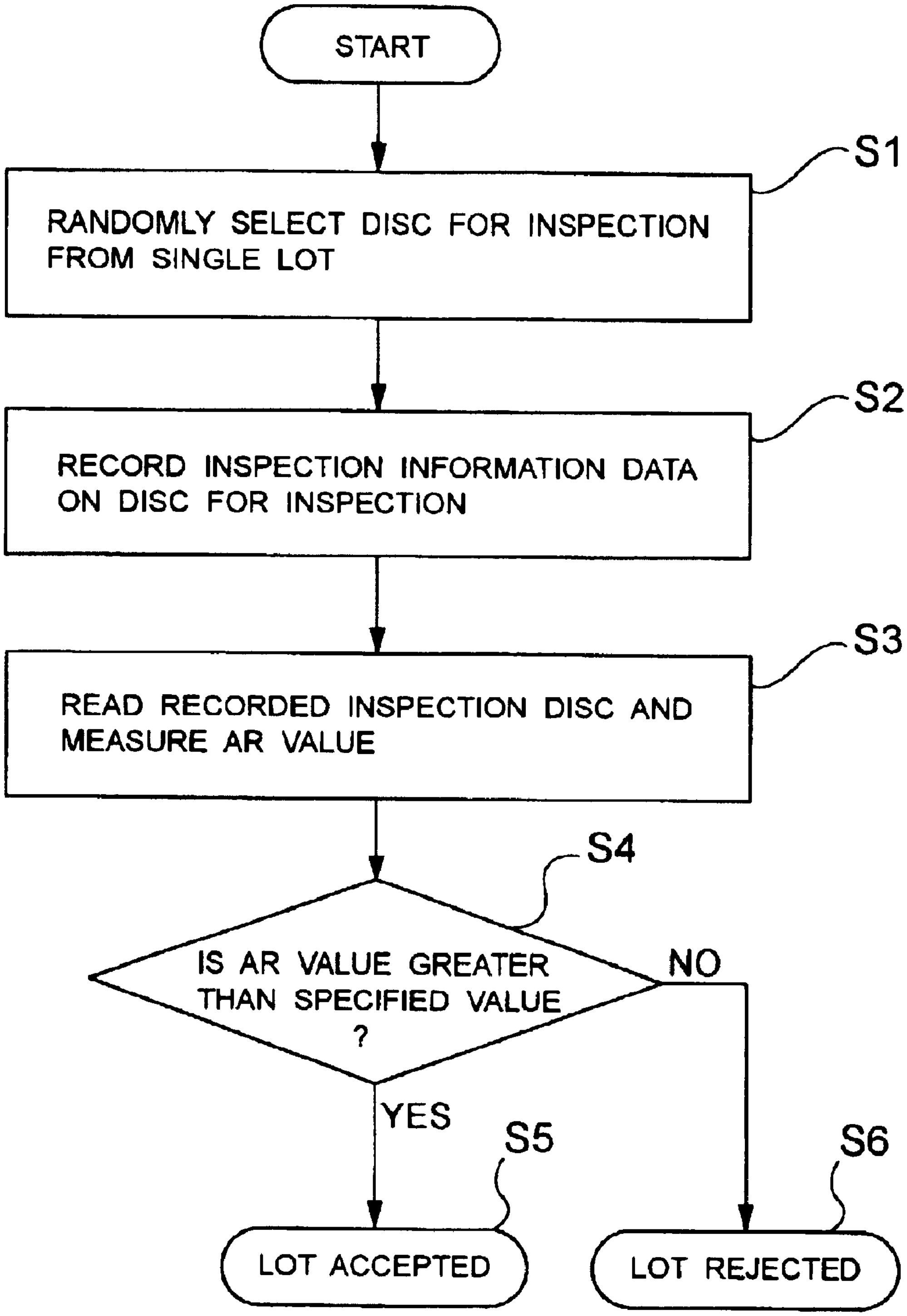
FIG. 9 is a flowchart of an inspection procedure for an optical disc.

Inspection of a manufactured optical disc by means of such an AR measuring apparatus is performed in the order shown in FIG. 9. That is, a disc to be inspected is randomly selected from a single lot (step S1). Information data for inspection is recorded on the disc to be inspected (step S2). A push-pull signal PP is generated as described above by reading from the recorded disc to be inspected by the writing/reading head 2, and an AR value is measured (step S3). Whether or not the measured AR value is more than a specified value is determined (step S4). If the AR value is more than the specified value, all the optical discs of the lot pass the inspection for LPP (step S5). If the AR value is below the specified value, all the optical discs of the lot fail the inspection (step S6).

Figure 4:
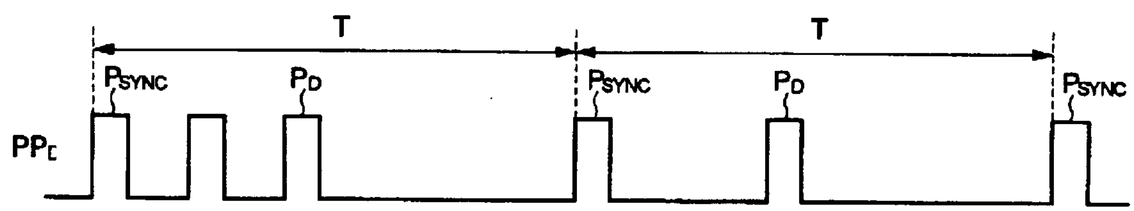
FIG. 4 shows the waveform of a pre-pit detection signal.
Figure 5:
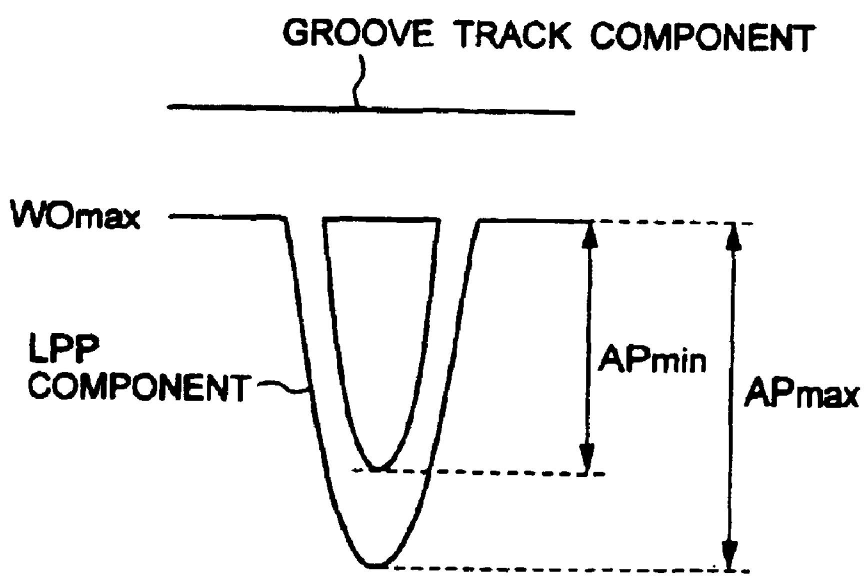
FIG. 5 shows an AR waveform.

During measurement of the AR in step S3, the push-pull signal PP output from the subtracter 33 is supplied to the oscilloscope 61. At the oscilloscope 61, the push-pull signal PP is sampled by the A/D converter 91 according to a clock with high frequency. The control circuit 92 stores the sampling data in the memory 93 sequentially. The control circuit 92 detects a negative peak value which is not less than a predetermined value of sampling data supplied from the A/D converter 91. Once the peak value is detected, the sampling data is stored in the memory 93 as trigger for a predetermined period of time. This peak value corresponds to the synchronous pulse $P_{SYNC}$ in FIG. 4. The writing into the memory 93 for a predetermined period of time is repeated n times. The control circuit 92 reads the data stored in the memory 93, supplies it to the display memory 94, and displays a waveform on the display panel 97. The read timing is, for example, set in response to a command from the operation unit 98. An overlapped waveform of a push-pull signal PP containing the third LPP component of the object to be inspected, that is, an AR waveform, is displayed. In this display, the time axis is adjusted so that the peak value position of the push-pull signal PP becomes the center line of display (time axial center line). The possible value for sampling data to have is 0 to M, depending on the resolution of the A/D converter 91.

The personal computer 62 can read and fetch sample data stored in the sample memory 93 by commanding the control circuit 92 of the oscilloscope 61 through the interface 99.

Figure 10:
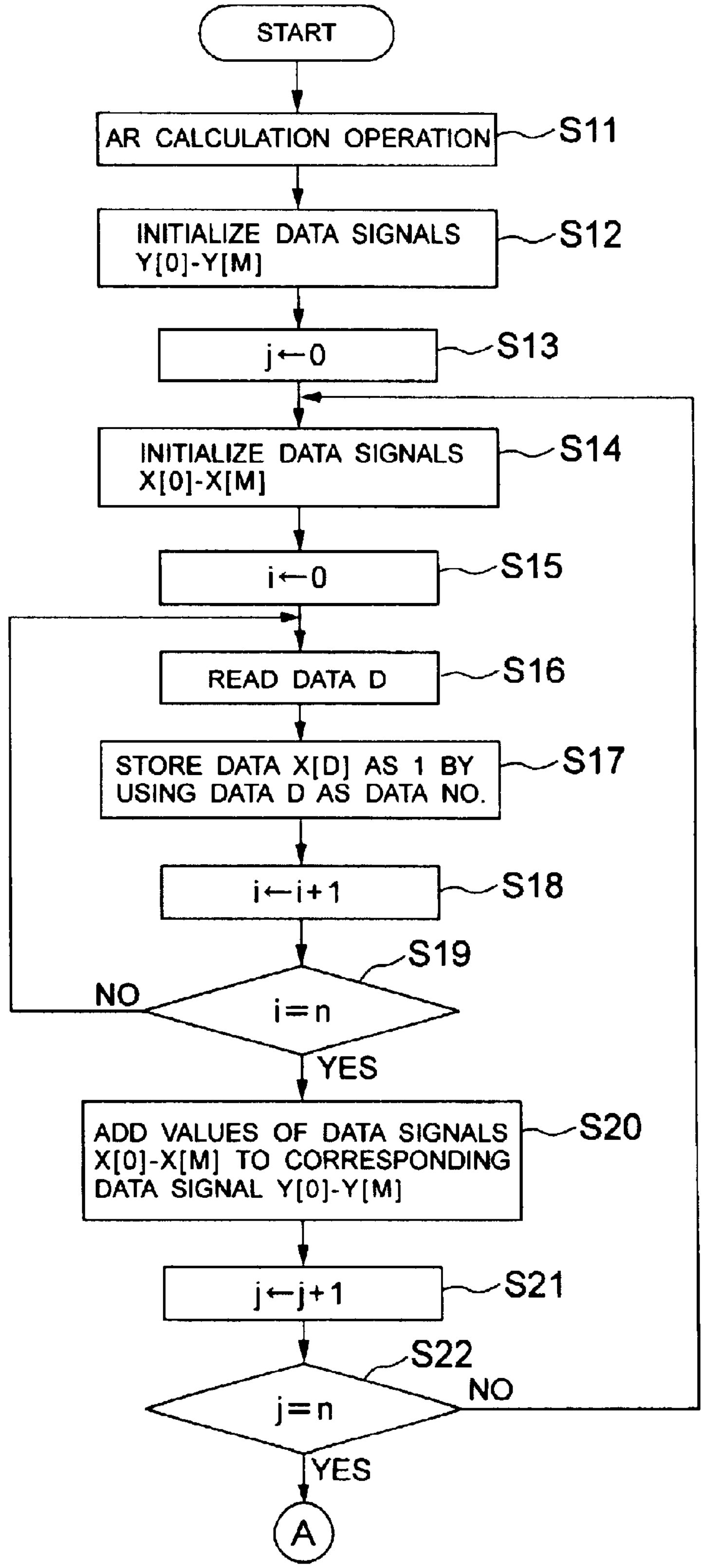
FIG. 10 is a flowchart illustrating an AR calculation operation by means of a CPU in FIG. 7.
Figure 11:
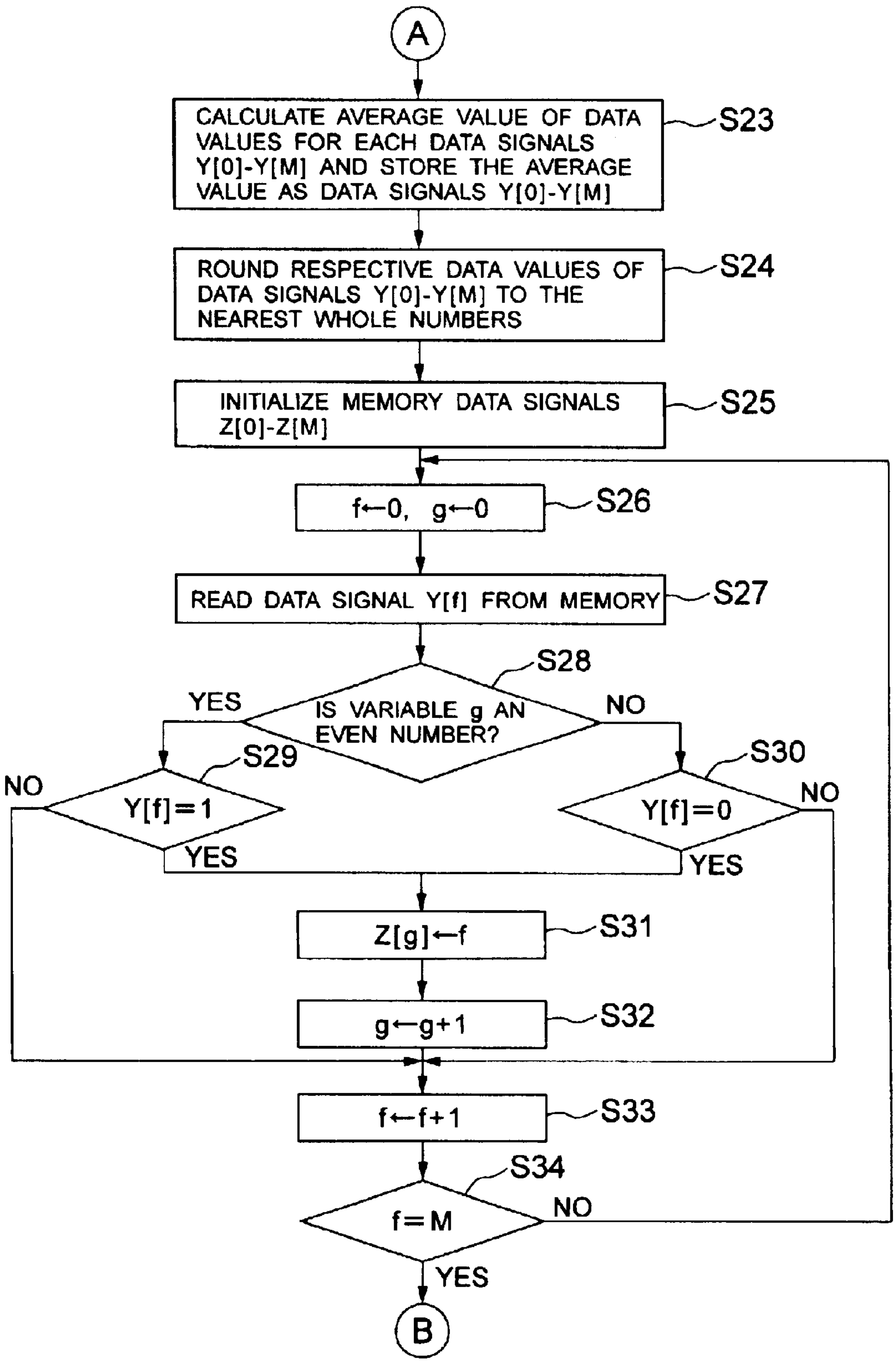
FIG. 11 is a flowchart illustrating the continued procedure of the AR calculation operation in FIG. 10.
Figure 12:
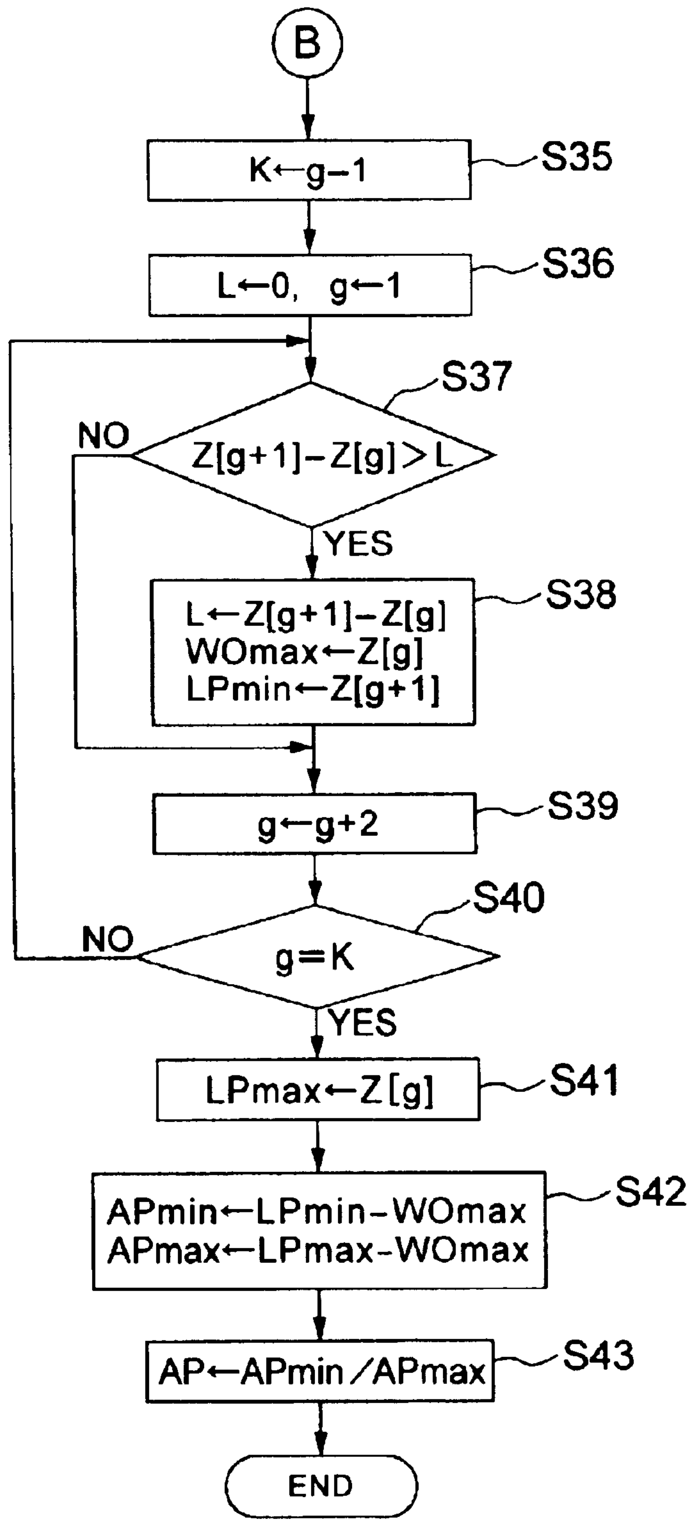
FIG. 12 is a flowchart illustrating the continued procedure of the AR calculation operation in FIG. 11.

The CPU 65 of the personal computer 62 calculates an AR value by the AR calculation operation as shown in FIGS. 10 to 12.

During the AR calculation operation, the CPU 65 sets the number of times N for measuring the AR waveform and the number of times n for fetching data (step S11). The numbers of times N and n may be set by input operation through the user's keyboard (not shown) or may be set previously.

The personal computer 62 initializes M+1 (M is a positive integer) data signals Y[0] to Y[M] formed in the internal memory 66 to 0 (step S12), and sets a variable j to 0 (step S13). The personal computer 62 also initializes M+1 data signals X[0] to X[M] formed in the internal memory 66 to 0 (step S14), and sets a variable i to 0 (step S15). The variable j is the present number of times for measuring the AR waveform and the variable i is the present number of times for fetching data.

The CPU 65 reads sampling data positioned on the display center line of the oscilloscope 61 as data D from the sample memory 93 (step S16), and stores data X[D] as 1 (step S17). The data signal number of the data X[D] is the value of the data D. The CPU 65 then adds 1 to the variable i (step S18), and determines whether or not the variable i has reached n, the number of times for fetching data (step S19).

If i<n, control returns to step S16 and reads sampling data positioned on the remaining display center line as the data D.

If i=n, n pieces of data have been read, the CPU 65 adds each value of data signals X[0] to X[M] to the corresponding data signals Y[0] to Y[M] (step S20). That is, the following operation is performed; Y[0]=Y[0]+X[0], Y[1]=Y[1]+X[1], . . . , Y[M−1]=Y[M−1]+X[M−1], Y[M]=Y[M]+X[M]. The CPU 65 adds 1 to variable j (step S21), and determines whether or not variable j was reached N, the number of times for measuring AR (step S22). If j<N, control returns to step S14 and repeats the operation of measuring the AR waveform in steps S14–S21. During this repeated operation, reading from different tracks of the disc to be inspected is performed.

If j=N, as shown in FIG. 11, the average value of each data value of data signals Y[0] to Y[M] is calculated (step S23). That is, the following operation is performed; Y[0]=Y[0]/N, Y[1]=Y[1]/N, . . . , Y[M−1]=Y[M−1]/N, Y[M]=Y[M]/N. Each averaged data value of data signals Y[0] to Y[M] is rounded to the nearest whole number (step S24). As each data value of data signals Y[0] to Y[M] is averaged and the average value is rounded, any data having grave contingency such as noise is eliminated.

After step S24 is executed, the CPU 65 of the personal computer 62 initializes M+1 data signals Z[0] to Z[M] formed in the internal memory 66 to 0 (step S25), and sets a variable f and a variable g to 0 (step S26). The data signals Z[0] to Z[M] correspond to the data signals Y[0] to Y[M]. The CPU 65 reads a data signal Y[f] from the internal memory 66 (step S27), and determines whether or not the variable g is an even number (step S28). If the variable g is an even number, whether or not the data Y[f] is 1 is determined (step S29). If the variable g is an odd number, whether or not the data signal Y[f] is 0 is determined (step S30). If it is determined that Y[f]=1 in step S29 or that Y[f]=0 in step S30, a data signal Z[g] is equalized to f (step S31). Next, the variable g is added to 1 (step S32) and the variable f is added to 1 (step S33). Then whether or not the variable f has reached the fixed value M is determined (step S34). If f<M, the control by the CPU 65 returns to step S27 and reads the next data signal Y[f] from the internal memory 66.

If it is determined that Y[f]=0 in step S29 or that Y[f]=1 in step S30, the control by the CPU 65 jumps to step S33. By the operations in steps S25 to S34, the value of f when the data signal Y[f] changes from 0 to 1 or from 1 to 0 is sequentially written into the data signal Z[g].

If f=M in step S34, as shown in FIG. 12, the value of the variable g after subtracting 1 is set as K (step S35). The value of K is the value of g when a value is finally set for the data signal Z[g] at step S31.

The CPU 65 then sets a variable L to 0 and sets the variable g to 1 (step S36). Next, whether or not Z[g+1]−Z[g] is larger than the variable L is determined (step S37). Z[g+1]−Z[g] means Z [even number]−Z [odd number] and indicates the length of an area where 0 continues. If Z[g+1]−Z[g]>L, the variable L is set as Z[g+1]−Z[g], and the maximum value WOmax of a wobbling group component is set as Z[g], and the minimum value LPmin of a LPP component is set as Z[g+1] (step S38). After the variable g is added to 2 (step S39), whether or not the variable g has reached K is determined (step S40). If g<K, the control by the CPU 65 returns to step S37 and whether or not Z[g+1]−Z[g]>L is determined using the new Z (even number) and Z (odd number) obtained in step S39.

If Z[g+1]−Z[g]≦L in step S37, the control jumps to step S39.

If g=K in step S40, the maximum value LPmax of the LPP component is set as Z[g] (step S41). APmin is calculated by LPmin−WOmax, and APmax is calculated by LPmax−WOmax (step S42). An AR value is then calculated by APmin/APmax (step S43). The CPU 65 displays the AR value calculated in step S43 on a display (not shown). Furthermore, whether or not the AR value is more than a specified value may be displayed as the result of step S4.

Figures 13A, 13B, 13C:
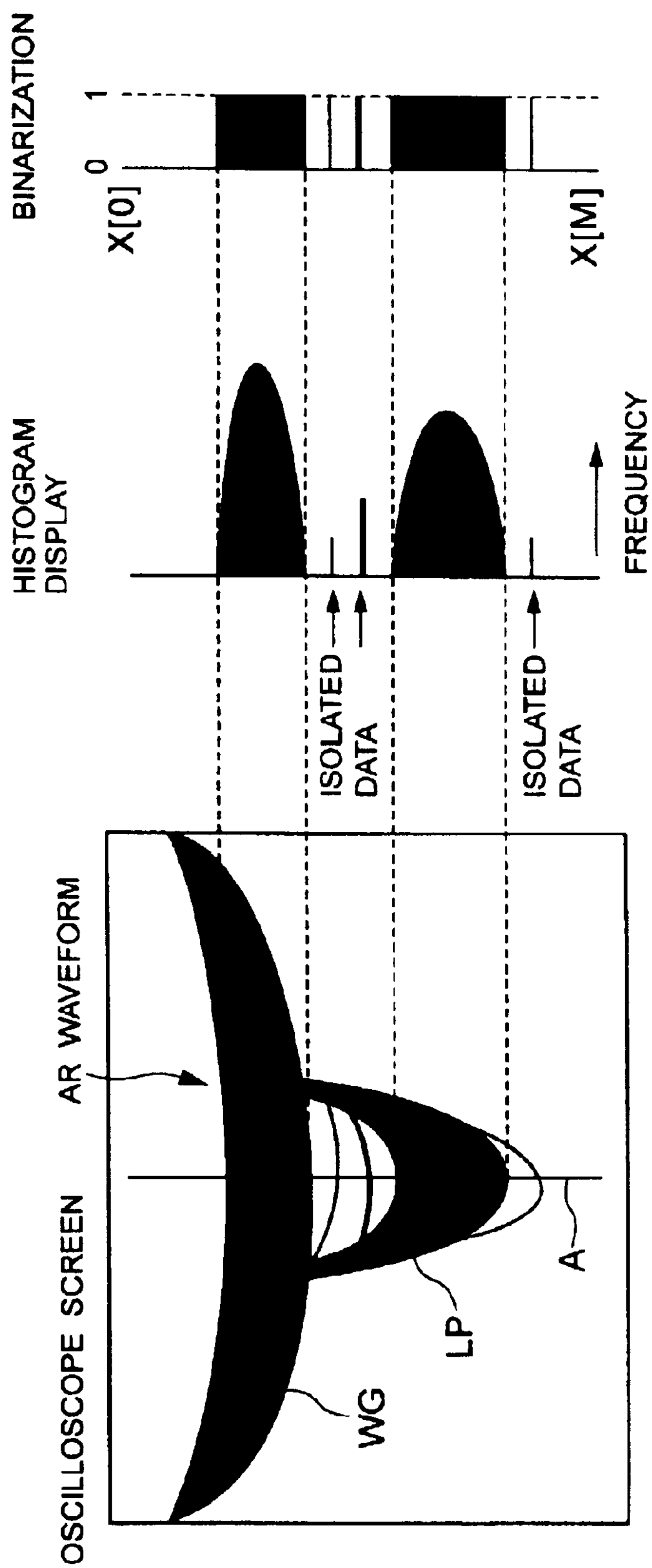
FIGS. 13A to 13C show a data value setting operation of a data signal in the AR calculation operation.

FIG. 13A shows an AR waveform displayed on the display panel 97 of the oscilloscope 61. In FIG. 13A, a line indicated by a reference code A on the display panel 97 is the display center line. The frequency of each data positioned on the display the center line A becomes as shown in FIG. 13B when displayed as a histogram. In the histogram display, a reference code WG corresponds to the wobbling group component, and a reference code LP corresponds to the LPP component. Other frequencies can be an orphan accidentally caused by the wobbling group part or LPP, or can be noise. The parts displayed as histograms are stored as X[D]=1 in the internal memory 66, as shown in FIG. 13C, regardless of the height of the frequency. Other parts are stored as 0 as their initial value is.

Figure 14B:
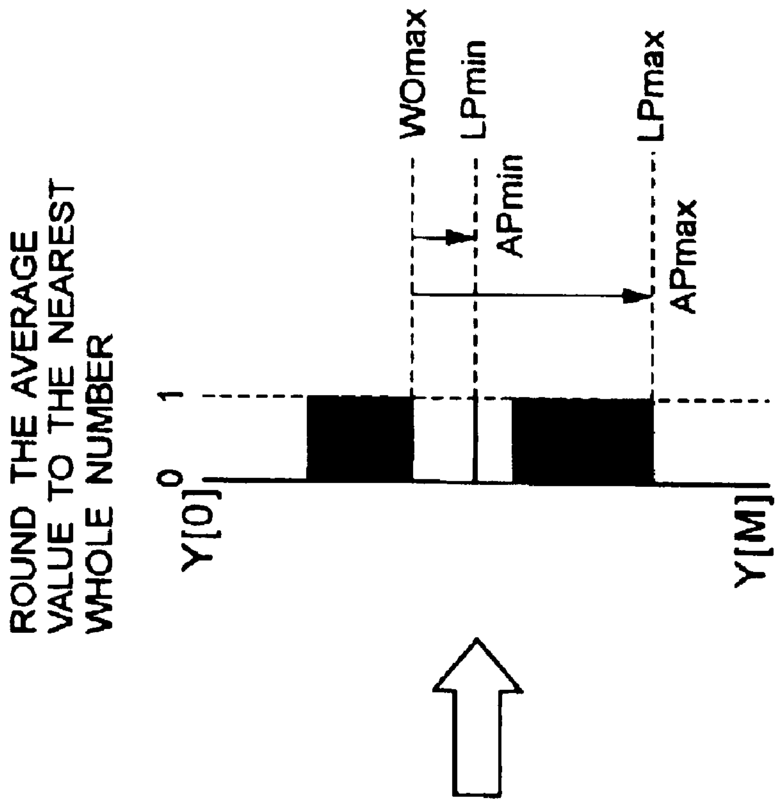
FIGS. 14A to 14B show averaging and rounding operations of data value in the AR calculation operation.
Figure 14A:
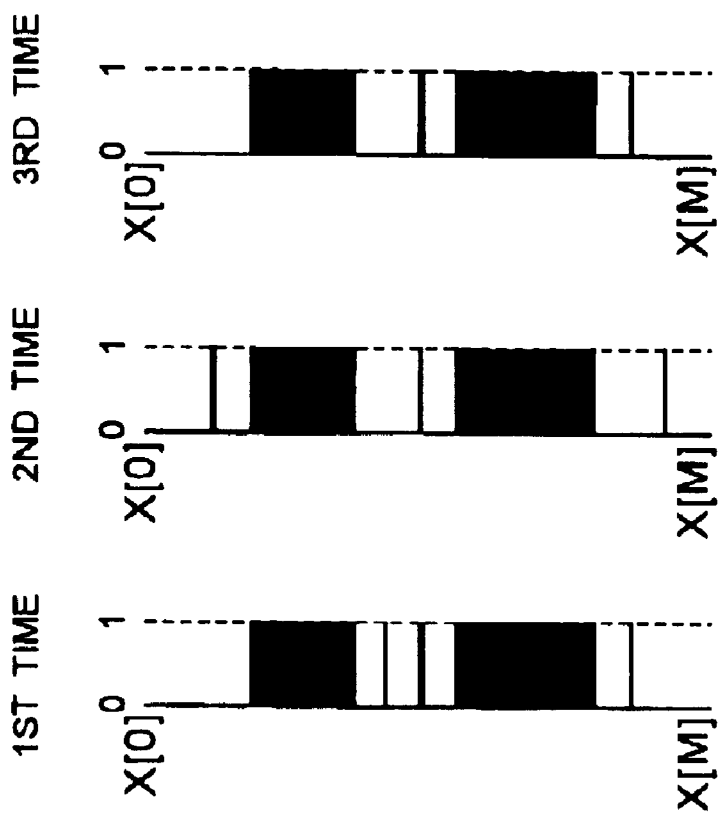

As the AR waveform measurement is repeated N times, the case where N=3 gives the result signals X[0] to X[M] by the first measurement, the result signals X[0] to X[M] by the second measurement, and the result signals X[0] to X[M] by the third measurement, as shown in FIG. 14A. The average value of these results is obtained in step S23 and the average value is rounded to the nearest whole number in step S24. Consequently, the results which are common among the first to third measurements remain as data signals Y[0] to Y[M], as shown in FIG. 14B. The rounding operation eliminates accidental orphans such as noise. The case of FIG. 14B contains an orphan having a value isolated from the range of fluctuation of the wobbling group component of the push-pull signal PP and the range of fluctuation of the LPP component of the push-pull signal. As the length of an area where 0 continues becomes maximum at the area formed between the maximum value of the wobbling group component WOmax, and the orphan value, the orphan data value becomes the minimum value of the range of fluctuation of the LPP component LPmin. Therefore, APmin is calculated by LPmin−WOmax, and APmax is calculated by LPmax−WOmax. The AR value is calculated by APmin/APmax.

The above-mentioned embodiment employs an oscilloscope. However, the present invention is not limited to the use of an oscilloscope. Any display unit of a configuration that is equipped with a memory that can store sampled data obtained by sampling a push-pull signal PP with high frequency can be used. It is not necessary for the display unit to indicate an AR waveform.

In the case of the above-mentioned embodiment, a rounding operation is performed in step S24. However, any method which can detect the fact that each data value at the point of time of the pre-pit position of the sample data by plural sampling occurred more than a predetermined frequency (preferably, a frequency more than half the above-mentioned plural times) can be used.

As described above, according to the present invention, it is possible to calculate the AR value of a disc to be inspected accurately, eliminating the irregular influences of dirt or scratches on the disc as much as possible. Therefore, the accuracy of the disc inspection can be improved, the possibility of rejecting a defect-free disc as defective can be avoided.

This application is based on Japanese Patent Application No. 2001-47778 which is hereby incorporated by reference.

What is claimed is:

1. An aperture ratio measuring apparatus for an optical recording medium having a recording surface provided with pre-pits which are repeatedly formed between tracks and carries information related to said tracks, comprising:

an optical detector having a light receiving surface divided into a first and second light receiving faces in the tangential direction of said track, for receiving the reflected light of a light beam radiated onto said recording surface on said first and second light receiving faces to output first and second light detection signals corresponding to respective amounts of the received light on said first and second light receiving faces;

a subtractor for calculating the difference between said first and second light detection signals output from said optical detector to generate a push-pull signal;

a collection device for collecting sample data by sampling said push-pull signal for a predetermined period of time and for repeating the sampling operation for the predetermined period of time by a plurality of times;

a frequency determination device for determining whether each data value corresponding to a pre-pit position of the sample data by the plurality of times collected by said collection device is obtained by a predetermined number of times or greater; and an aperture ratio calculator, when data values obtained by the predetermined number of times or greater are determined by said frequency determination device, for calculating as an aperture ratio, a ratio between the minimum value and the maximum value of values corresponding to a pre-pit component of the data values obtained by the predetermined number of times or greater.

2. An aperture ratio measuring apparatus according to claim 1, wherein said predetermined number of times is equal to or more than a number of half said plurality of times.

3. An aperture ratio measuring apparatus according to claim 1, wherein said frequency determination device determines data values of the predetermined number of times or greater by calculating frequencies for the respective data values for said plurality of times, dividing the respective frequencies by said plurality of times, and rounding results of the divisions to the nearest integers.

4. An aperture ratio measuring apparatus according to claim 3, wherein said frequency determination device includes a storage device for storing first data signals and second data signals each of which indicates a data value in a range which said sample data is changeable as an initial value, zero, and a data fetching device for performing a fetching process by fetching the data value at the pre-pit position obtained from said collection device and by setting one signal of said first data signals corresponding to the fetched data value to one in said storage device, for performing an increment process by adding the respective data values of said first data signals to the respective data values of said second data signals corresponding to the first data signals for every time said fetching process for one of the plurality of times is completed, and after that, for performing said fetching process for another one of the plurality of times after setting the respective data values of said first data signals to zeros, the respective data values of said second data signals are used as the frequencies when said increment process for the plurality of times is completed.

5. An aperture ratio measuring apparatus according to claim 1, wherein said aperture ratio calculator sets as the minimum value corresponding to said pre-pit component, the greater one of two data values defining the maximum range continuously containing no data value in distribution of data values corresponding to the pre-pit position each which is obtained by the predetermined number of times or greater.

6. An aperture ratio measuring method for an optical recording medium having a recording surface provided with pre-pits which are repeatedly formed between tracks and carries information related to said tracks, comprising:

an optical detection step for receiving the reflected light of a light beam radiated onto said recording surface, on a light receiving surface having first and second light receiving faces divided in the tangent direction of said track, to output first and second light detection signals corresponding to respective amounts of the received light on said first and second light receiving faces;

a subtraction step for calculating the difference between said first and second light detection signals to generate a push-pull signal;

a collection step for collecting sample data by sampling said push-pull signal for a predetermined period of time and for repeating the sampling operation for the predetermined period of time by a plurality of times;

a frequency determination step for determining whether each data value corresponding to a pre-pit position of the sample data by the plurality of times collected in said collection step is obtained by a predetermined number of times or greater; and an aperture ratio calculation step, when data values obtained by the predetermined number of times or greater are determined in said frequency determination step, for calculating as an aperture ratio, a ratio between the minimum value and the maximum value of values corresponding to a pre-pit component of the data values obtained by the predetermined number of times or greater.

7. A computer readable medium including a computer program that when executed causes a computer to perform steps to execute a measuring process in an aperture ratio measuring apparatus for an optical recording medium having a recording surface provided with pre-pits which are repeatedly formed between tracks and carries information related to said tracks, said steps comprising:

an optical detection step for receiving the reflected light of a light beam radiated onto said recording surface, on a light receiving surface having first and second light receiving faces divided in the tangent direction of said track, to output first and second light detection signals corresponding to respective amounts of the received light on said first and second light receiving faces;

a subtraction step for calculating the difference between said first and second light detection signals to generate a push-pull signal;

a collection step for collecting sample data by sampling said push-pull signal for a predetermined period of time and for repeating the sampling operation for the predetermined period of time by a plurality of times;

a frequency determination step for determining whether each data value corresponding to a pre-pit position of the sample data by the plurality of times collected in said collection step is obtained by a predetermined number of times or greater; and an aperture ratio calculation step, when data values obtained by the predetermined number of times or greater are determined in said frequency determination step, for calculating as an aperture ratio, a ratio between the minimum value and the maximum value of values corresponding to a pre-pit component of the data values obtained by the predetermined number of times or greater.

* * * * *